United States Patent [19]
Lemaire

[11] 3,942,664
[45] Mar. 9, 1976

[54] DEVICE FOR HANDLING A LOAD BUCKET REMOVABLY MOUNTABLE ON A VEHICLE

[76] Inventor: Pierre Lemaire, 5 Avenue des Frenes, Vaux le Penil, 77000 Melun, France

[22] Filed: Dec. 11, 1974

[21] Appl. No.: 531,533

[30] Foreign Application Priority Data
Dec. 20, 1973 France............................. 73.45675

[52] U.S. Cl............ 214/505; 214/77 R; 214/146.5; 214/515
[51] Int. Cl.² .......................................... B60P 1/28
[58] Field of Search ........... 214/505, 515, 516, 517, 214/146.5, 77 R; 298/12, 14

[56] References Cited
UNITED STATES PATENTS
3,819,075  6/1974  Derain ........................... 214/515 X
3,825,137  7/1974  Mackrill et al. .................... 214/515

Primary Examiner—Albert J. Makay
Attorney, Agent, or Firm—Burgess Ryan and Wayne

[57] ABSTRACT

A device for handling a load bucket removably mountable on a vehicle is adapted to load said bucket onto the vehicle, to remove said bucket from the vehicle and to tilt about the rear end of said vehicle with a view to evacuating or dumping a load from said bucket. The device comprises a boom pivotally mounted on one end of an arm the other end of which is pivotally mounted on a transverse shaft. Said transverse shaft is displaceable in a longitudinal direction by means of slide members guided in slide ways. The boom comprises lugs adapted to co-operate with stop or abutment members in such a way that a hydraulic jack which imparts an angular motion to the said arm simultaneously causes the boom to be angularly displaced. The instant device thus is capable of effecting all the above-mentioned handling operations by means of a single hydraulic jack.

12 Claims, 13 Drawing Figures

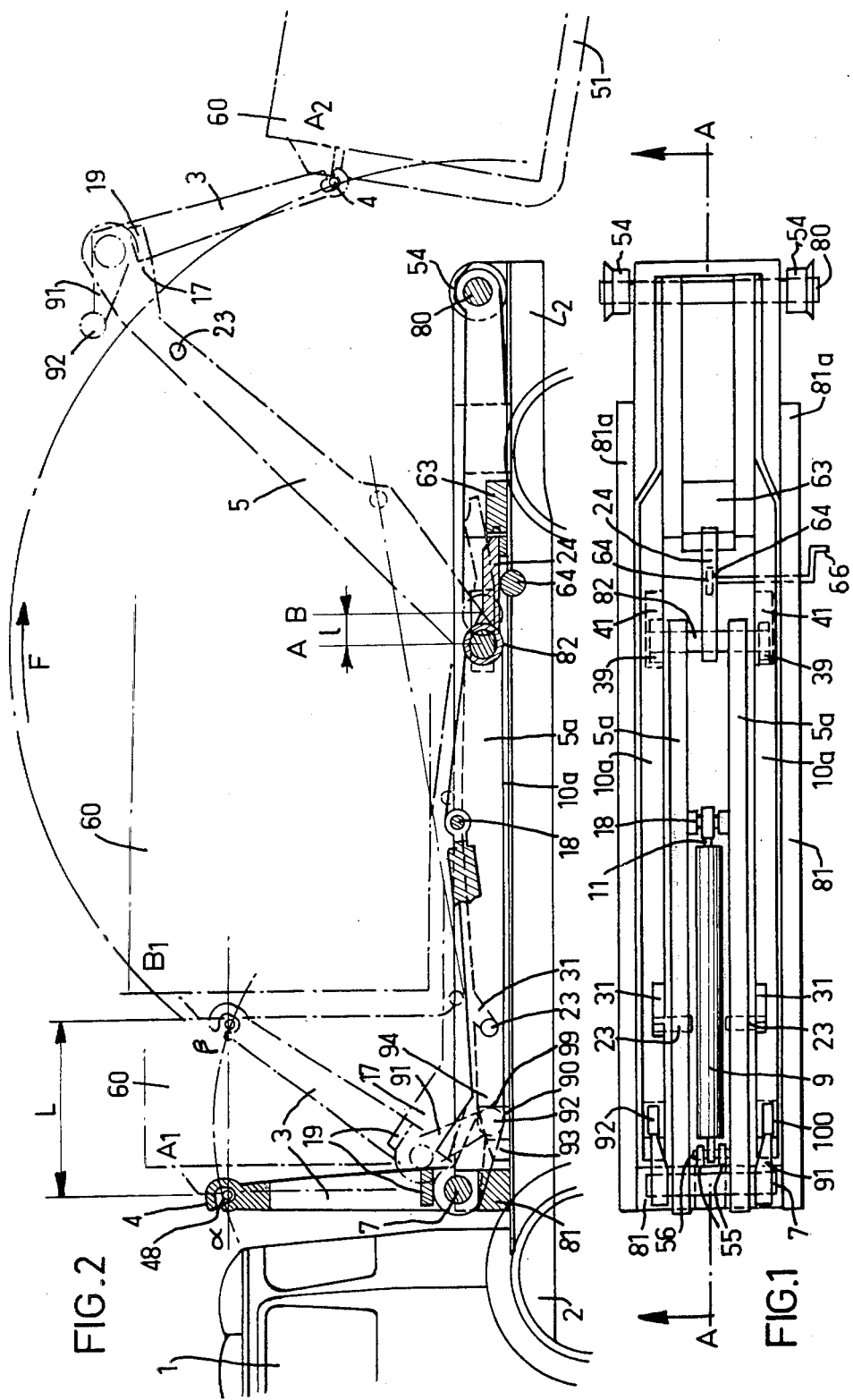

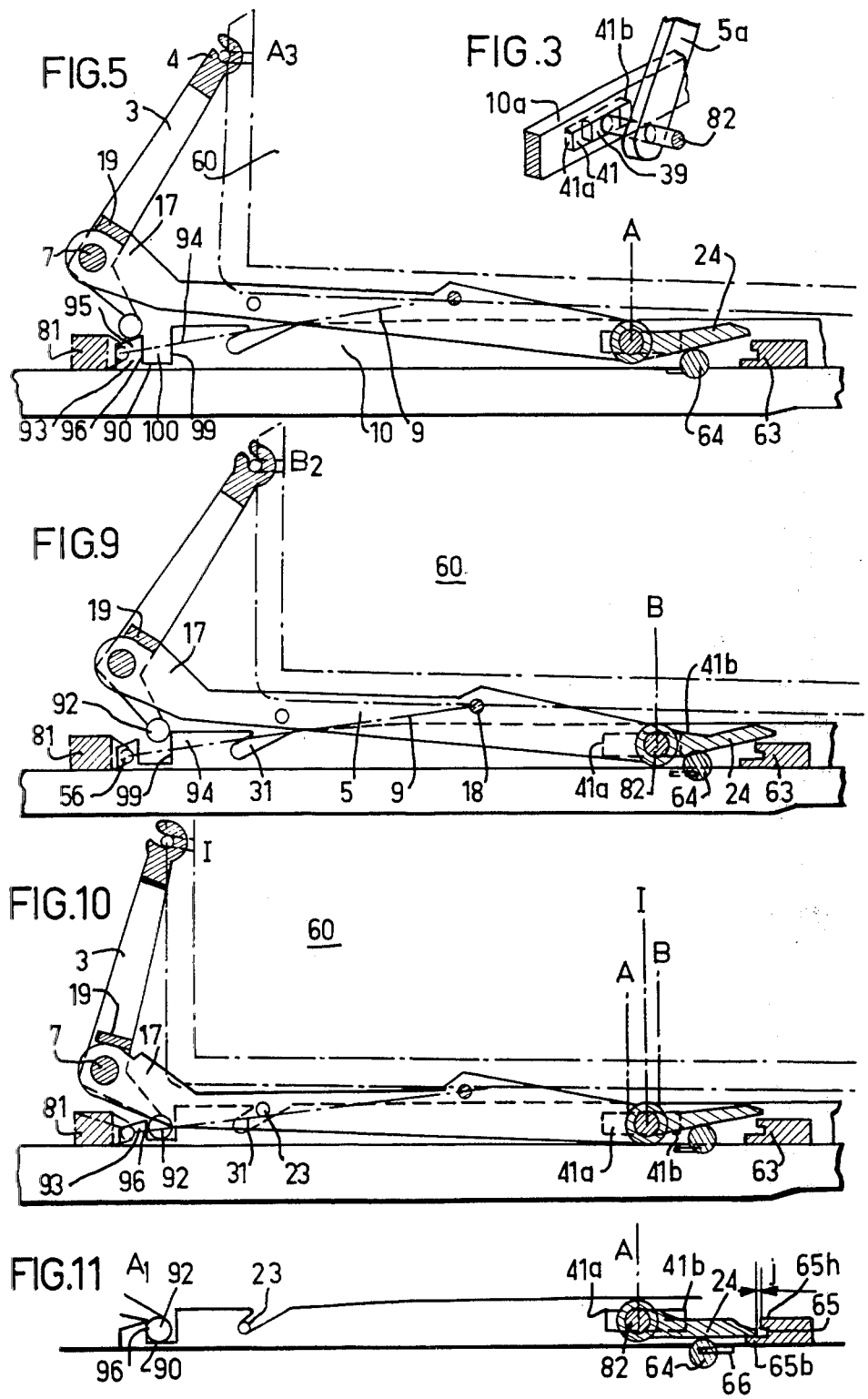

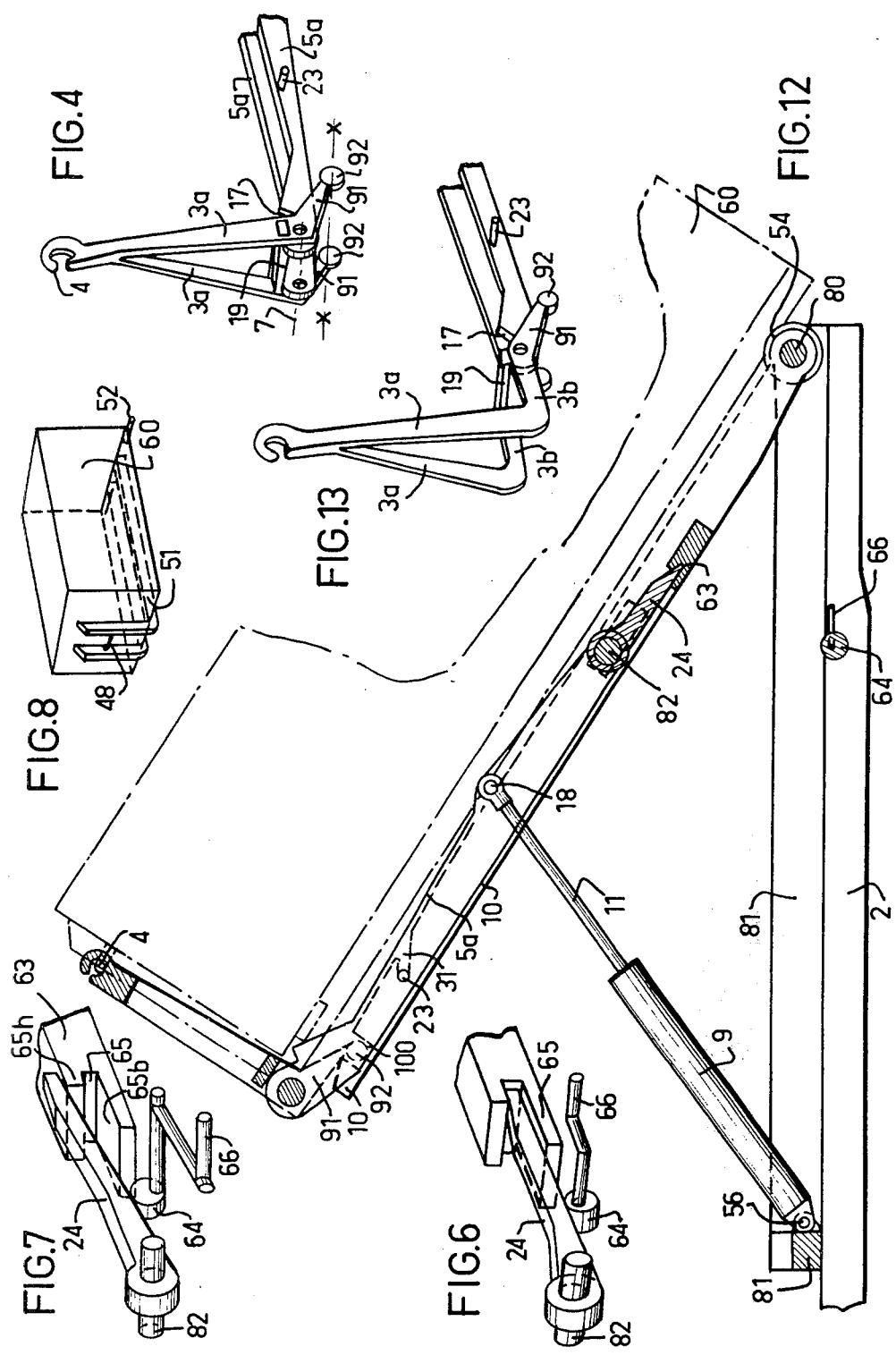

DEVICE FOR HANDLING A LOAD BUCKET REMOVABLY MOUNTABLE ON A VEHICLE

The instant invention is related to a device for handling a load bucket removably mountable on a vehicle, said device enabling specially said load bucket to be selectively placed onto, or removed from, said vehicle, or to be inclined for evacuating a load from said bucket. The invention, more particularly, relates to a device of the above-designated type which is adapted to be associated with a road vehicle and which enables a heavy and bulky truck load bucket to be handled.

In known devices of this kind, the loading and unloading of the load bucket is effected by means of a hoist or winch which is driven by a hydraulic motor, or by means of one or two pressure fluid jacks, especially hydraulic jacks which act on a cable hoist. In each one of the above-mentioned devices the unloading of the load bucket, i.e., the removal thereof from the associated vehicle, is effected by gravity. The inclining or dumping of the load bucket is effected by a frame hingedly connected to the rear end of the vehicle and controlled by one or several pressure fluid jacks, especially hydraulic jacks.

These known devices are disadvantageous, especially in that they require manual operations for attaching and removing the cables; furthermore, these known devices do not enable the user to place the laod bucket onto a comparatively elevated quay or onto a trailer, unless special supplementary means are provided to this end.

In another type of known devices for handling load buckets associated with vehicles, the hauling of the load bucket is not effected by means of a winch or cable hoist, but by means of pressure fluid jacks acting on an extension arm or the like. The displacement of the load bucket on the vehicle is not obtained by gravity, then, but by the force of the pressure fluid jacks. Consequently, this known system is reversible, as far as its operation is concerned, and it enables the load buckets to be deposed on a comparatively elevated quay or onto a trailer, without any special arrangement or implements.

One known device of this latter type comprises an angle bracket which is displaceable so as to move along a circular path, and which is provided at its free end with means for seizing or gripping the load bucket.

With a view to limiting the power, required especially for hoisting the load bucket onto the vehicle, this angle bracket may be slideably mounted in slide-ways and be displaced by a pressure fluid jack. Furthermore, two other pressure fluid jacks are provided for imparting a pivotal motion to said slide ways on the chassis of the vehicle.

This known device is comparatively expensive due to the fact that three pressure fluid jacks, especially hydraulic jacks, are required; furthermore, this device is comparatively fragile. Indeed, the slideably mounted angle bracket which is already comparatively fragile due to its structure is submitted to dangerous torsional forces when the load bucket is being loaded or unloaded on uneven ground, the load bucket then exhibiting a tendency to tilt laterally, as it is being gripped or held only at one single point.

It is an object of the instant invention to overcome the drawbacks of the known devices, and to provide a handling device of the kind considered which allows the same results to be achieved as those obtained with the known devices, while being less expensive and having a more rugged construction, as well as a lighter weight than that of the known devices.

According to the instant invention a device for handling a load bucket removably mountable on a vehicle comprises a boom having first and second ends and being provided, at said first end, with gripping means for gripping said bucket, while being pivotally connected at said second end to an arm which is rotatably connected to a shaft arranged transversely with respect to the framework of said vehicle and supported by a chassis which has a front end and a rear end and which also supports said boom, means being provided for angularly displacing said arm in a substantially vertical plane, at least one stop member being provided on said arm in the vicinity of the point of pivotal connection between said arm and said boom for limiting the pivotal movements of said boom, said second end of said boom being provided with at least one lug adapted to cooperate with at least two abutment members located on a line extending longitudinally with respect to said vehicle, said abutment members being fixedly mounted on said front end of said chassis, said chassis comprising means for enabling said transverse shaft to be displaced longitudinally with respect to the framework of said vehicle, as well as shaft locking means for locking said shaft in a desired position, said chassis being pivotally mounted at its end opposed to said boom on said vehicle framework, said device further comprising arm locking means for locking said arm in a predetermined angular position with respect to said chassis, when said load bucket is placed on said vehicle.

In accordance with one important feature of the instant invention the means used for angularly displacing said arm are the same means which are used for longitudinally displacing said transverse shaft to which said arm is pivotally connected, whereby said displacement co-relatively causes a pivotal movement of the boom when at least one of the lugs provided on the latter engages at least one of said abutment members provided on the chassis.

Due to this arrangement the boom is enabled to substantially effect two successive rotational movements, thus allowing the load bucket to be loaded or unloaded.

It will be understood that the instant invention allows on the one hand a framework comprising two juxtaposed members to be used for the construction of the boom and the arm supporting said boom, and allows, on the other hand, the utilization of one single pressure fluid jack for controlling all the operations which are required for handling the load bucket.

In accordance with one embodiment of the instant invention the above-mentioned arm comprises two juxtaposed beam members to which said boom is pivotally connected at two locations, an actuating pressure fluid jack for controlling said arm being mounted between said beam members constituting said arm. This fluid pressure jack is pivotally mounted on a frame integral with the framework of the vehicle and pivotally mounted on a transverse member which connects said beam members constituting said arm.

In this embodiment of the instant invention said boom comprises at each one of its ends a lug rigidly connected to the boom and disposed at respective locations beyond the respective adjacent pivotal connections between said beam members and said arm, and on the side opposed to the gripping means, each one of said lugs being adapted to be engaged between two abutment members arranged within each one of said beam members of the chassis supporting said arm, which chassis is supported by the frame which is integrally connected to the framework of the vehicle.

The lugs integrally connected to the boom impart the angular movement to the latter towards the rear part of the vehicle, when said lugs engage the respective associated abutment members during the extension motion of the pressure fluid jack with a view to unloading the load bucket. The said lugs cause a forwardly directed angular movement of the boom when they engage the respective associated abutment members during the retracting motion of the pressure fluid jack with a view to loading the load bucket.

The instant invention will be described hereinafter in a more detailed manner with reference to the appended drawings which are given by way of example. Said drawings and the description hereinafter are not to be construed as limiting the scope of the instant invention.

FIG. 1 shows the device according to the instant invention, viewed from the above, the load truck and the end portion of the boom beyond its pivotal connection to the arm being omitted.

FIG. 2 shows at A1 a sectional view taken along the line A—A of FIG. 1. This Figure shows two successive phases B1 and A2 of the operation of loading the load bucket; A1 shows the device in the transportation position, or a position corresponding to the start of the unloading operation, or in a position corresponding to the end of the loading operation.

FIG. 3 is a detailed view of the connection between the arm and the chassis.

FIG. 4 shows a boom in its entirety, which is associated to the ends of the beam members constituting the arm.

FIGS. 5, 9 and 10 represent successive phases of a loading operation.

FIGS. 6 and 7 illustrate details of the locking mechanism for the transverse shaft on which the arm is pivotally mounted; more particularly FIG. 6 shows said mechanism in the locked position, while FIG. 7 shows the same mechanism in the unlocked position.

FIG. 8 is a perspective view of the load bucket.

FIG. 11 shows in detail the respective positions of the rollers and the locking beam when the device is in the position shown at A1 in FIG. 2.

FIG. 12 is an elevational view showing the position of the device according to the invention when the load bucket is being inclined about the rear end of the vehicle.

FIG. 13 shows another embodiment of the boom.

In the embodiment illustrated by FIGS. 1 to 12 the handling device according to the instant invention is mounted on a road vehicle constituted by a truck 1. This device, as illustrated, is adapted to unload a load bucket 60 from the truck 1 or to load said load bucket 60 onto said truck 1, and to incline said load bucket on the truck with a view to evacuating a load previously placed into said bucket.

As shown in FIGS. 1 and 2 the handling device comprises a boom 3 provided at its free end with a gripping element and pivotally connected on a rotatively mounted arm 5 disposed on a chassis 10.

This arm comprises two beam members 10a pivotally mounted on a shaft 80 which is mounted, in turn, in a transverse position at the rear end of a frame 81 rigidly connected to the framework 2 of truck 1. The handling device is supported on the truck by the intermediary of said frame.

Arm 5 comprises two beam members 5a connected by a cross-member 18 and by a transverse shaft 7 on which boom 3 is pivotally mounted. Beam members 5a are pivotally mounted on a terminal shaft 82 supported by chassis 10. Furthermore beam members 5a are slightly angled in a vertical plane near their ends so that when boom 3 is actuated arm 5 can not interfere with the motions of the load bucket.

A hydraulic jack fed by a hydraulic pressure source provided on the truck is mounted between the beam members 5a of beam 5 and pivotally connected on the one hand to frame 81 by means of a shaft 56 supported by forks 55 integral with frame 81, and pivotally mounted, on the other hand, on a cross member 18 which connects beam members 5a. It will be understood that under the action of rod 11 of jack 9, arm 5 may be rotated in a substantially vertical plane so as to cause displacements of boom 3.

In accordance with an important feature of the instant invention, which is illustrated particularly in FIG. 3, the terminal transverse shaft 82 on which the two beam members 5a of arm 5 are pivotally mounted is provided at its ends with two slide members 39 adapted to be slidingly displaced each in a slideway 41 provided in each of the beam members 10a of chassis 10. Slideways 41 enable the terminal transverse shaft 82 of the arm 5 to effect the translational motion which causes the angular motion of boom 3.

Referring now to FIG. 4 it will be seen that boom 3 comprises at one of its ends two substantially straight beams 3a which are juxtaposed (i.e., side by side), each of said beams or beam members 3a forming a lug 91, while at the other end of boom 3 the latter is formed with a hook 4 integral with the two beam members 3a which converge so as to constitute the end of boom 3 shaped with said hook 4.

Each one of beam members 3a, which are of a symmetrical configuration, is pivotally mounted on a shaft 7 (indicated in FIG. 4 by a dash-point line) at a location between lug 91 and hook 4, in the immediate vicinity of said lug.

With a view to facilitate the co-operation between these lugs and the abutment members provided at the front ends of the beam members 10a of the chassis, rollers 92 are provided at the free end of said lugs 91.

Each lug is adapted to engage a recess 100 provided in beam members 10a (cf. FIG. 5). In front of, and behind each one of said recesses are provided respective abutment members 93, 94 which are spaced in the longitudinal direction. Abutment member 93 which is arranged in front of abutment member 94 has a slightly inclined front face 94 and a vertical rear face 96. Abutment member 94 which is arranged behind the recess 100 only has one operative surface 99 which is vertical and directed forwardly.

The two vertical surfaces 96 and 99 delimit the recess 100. A horizontal surface 90 connecting said two abutment members constitutes the bottom of said recess. A certain clearance is provided between the two abutment members so as to enable lug 91 and the associated roller 92 to pass. Bottom 90 constitutes a bearing surface for rollers 92.

In accordance with an important feature of the instant invention beam members 5a of arm 5 bear each, as shown in FIG. 4, a stop member 17 arranged in the vicinity of the point of pivotal connection between beam member 3a of the boom and the corresponding beam member of the arm. Cross member 19 connecting the two beam members 3a of boom 3 in the vicinity of pivoting shaft 7 is adapted to engage the above-mentioned two stop members 17. In the embodiment shown this arrangement limits the amplitude of the angular movement of boom 3 with reference to beam members 5a of arm 5 to about 35°.

Referring now to FIGS. 6 and 7, means provided in accordance with the instant invention for locking the transverse terminal shaft 82 to which the arm 5 is pivotally connected, will be described hereinbelow.

An axial locking beam 24 is pivotally mounted on transverse terminal shaft 82; the end of said locking beam is adapted to co-operate selectively with a stop member 63 constituting a cross member of chassis 10. More particularly, locking beam 24 is adapted to co-operate with a cam 64 which may be actuated by means of a crank 66 so that locking beam 24 connected to transverse terminal shaft 82 may be raised, as shown in FIG. 7, so as to enable the transverse terminal shaft to be moved rearwardly by sliding over the stop member.

According to another feature of the instant invention, means are provided for locking arm 5 with respect to chassis 10 so as to prevent arm 5 from executing any angular movement when load bucket 60 is placed onto the vehicle.

In the embodiment shown these locking means lateral studs 23 mounted on beam members 5a constituting arm 5 and recesses 31 provided in the beam members 10a constituting chassis 10, said recesses being adapted to receive studs 23 when transverse terminal shaft 82 is in its forward position (cf., FIG. 10).

Furthermore, with a view to facilitating the loading and unloading of load bucket 60 guide rollers 54 are provided. Load bucket 60 is provided with beam members 51 which during the various handling operations may roll on these guide rollers. On the other hand, the above-mentioned beam-members will bear on flanges 81a of frame 80 when load bucket 60 is definitely loaded on the vehicle. Load bucket 60 also is provided with a hoisting ring 48 connected to the bucket. Two terminal rollers 52 are provided for facilitating the displacement of the load bucket on the ground during the various phases of handling (cf., FIG. 8).

The successive operations which may be effected by means of the device according to the instant invention, to wit unloading of load bucket 60, loading and dumping (inclining) of the bucket with a view to evacuating a load from said bucket will be described herein-below.

The unloading operation will be described first, as follows:

Referring to FIG. 2 which shows load bucket 60 placed on the vehicle in position A1, it will be seen that hook 4 of boom 3 engages connecting member 48 and thus prevents load bucket 60 from moving in a longitudinal direction.

Load bucket 60 bears on flanges 81a of frame 81 and on rollers 54, through beam members 51.

The rollers 92 of the lugs are engaged in the recess 100 provided between the stop or abutment members 93 and 94 and bear on the horizontal surface 90 which is also integral with the forward end portion of chassis 10. Chassis 10 reposes on a cross-member (not shown) of frame 81. The two beam members constituting arm 5 repose on the transverse front beam of frame 81.

The rod of hydraulic jack 9 is in its entirely retracted position and the studs 23 of arm 5 are engaged in the recesses 31. Transverse terminal shaft 82 is in its position A wherein it is in abutment with the front ends 41a of slideways 41, through the intermediary of slide members 39 (cf. FIG. 3); furthermore, as shown in FIG. 11, the end of locking beam 24 which resposes on the arm 65b of notch or groove 65 defines a clearance J with respect to the upper portion 65h of said notch. As will be described hereinafter, due to this clearance locking beam 24 may be raised.

The unloading operation will now be described with reference to FIG. 2.

With a view to enable transverse terminal shaft 82 to effect a rearward displacement, cam 64 is first rotated so as to raise locking beam 24. Hydraulic jack 9 is then actuated, whereby rod 11 of said jack displaces through the above-mentioned arm the transverse terminal shaft 81 along the slideways 41 (cf., FIG. 3). At the same time, locking beam 21 glides on cam 64 and passes through the upper part 65h of notch 65 (cf. FIG. 7).

Rollers 92 of lugs 91 bear on the horizontal surface 90 and engage the vertical surface 99 so as to displace boom 3 angularly in a rearward direction whereby load bucket 60 is displaced (cf., FIG. 2) so as to effect a rearward movement in position B1, while the beam members 51 of the load bucket are in rolling engagement with guide rollers 54. The center of rotation of the angular motion of boom 3 is located on axis xx' connecting the centers of rotation of the two rollers 92 (cf., FIG. 4). The arm 5 simultaneously effects an upwardly directed angular displacement about transverse terminal shaft 82 and a translational displacement in the direction of the rear end of the vehicle, along slideway 41.

It is highly important to point out that boom 3, due to lugs 91 which bear on chassis 10, is raised while effecting a pivotal movement and is thus enabled to be displaced along a circular path with respect to the vehicle, the starting point $\alpha$ and the end point $\beta$ of said circular path being located on the same horizontal line. This is an absolutely necessary requirement with a view to satisfactory operation of the instant device, as the connecting member 48 of the load truck is absolutely prevented, during its displacement toward the rear end of the vehicle, from being lowered below the level defined by a horizontal line passing through starting point $\alpha$. This would be the case if the boom 3 were not provided with the above-described lugs which impart to said boom a raising motion while imparting thereto simultaneously a pivotal motion.

During this displacement the lateral studs 23 leave the recesses 31 (cf., FIG. 2) and thus unlock the beam members 5a of arm 5 with respect to chassis 10.

At the end of this first phase of operation boom 3 has effected an angular displacement of about 35° with respect to the arm and engages through cross member 19 stop members 17 of arm 5 (cf., FIG. 4). Furthermore, transverse terminal shaft 82 is in its abutting position B (cf., FIG. 2), wherein it engages the ends 41b of slideways 41 through slide members 39 (cf., FIG. 3), and rollers 92 of lugs 91 engage the surfaces 99. It is important to point out that, as shown in FIG. 2, at the end of this phase load bucket 60 has been shifted from position A1 to position B1, by effecting a rearward movement over a distance L substantially greater than the distance l over which transverse terminal shaft 82 has moved backwardly between A and B, and thus substantially greater than the distance over which the rod of the hydraulic jack has moved during its extension motion.

In the described embodiment, L represents a length about seven times greater than $l$. It should be pointed out, too, that the power to be produced by hydraulic jack 9, to wit the power necessary to the substantially horizontal translational displacement of the load bucket (which displacement is comparatively small in magnitude) multiplied by the number representing the ratio of the lever arms remains relatively small as compared to the maximum power required, especially with a view to hoisting the load bucket onto the vehicle.

The actuation of hydraulic jack 9 is continued, and consequently arm 5 which effects its angular displacement about terminal transverse shaft 82 is raised, said transverse shaft 82 being locked in position B as shown in FIG. 2, due to the fact that the slide members supporting shaft 82 engage the rear ends of slideways 41. Simultaneously the rollers 92 associated with lugs 91 roll on the substantially vertical surface 99 of the rear-stop member 94, and arm 5 effects an angular displacement indicated by arrow F and thus displaces boom 3 which remains locked in its angular position with respect to arm 5, due to the effect of stop members 17. This angular displacement of arm 5 and boom 3 causes the displacement of load bucket 60 which is tilted while rolling on guide rollers 54. When arm 5 reaches a substantially vertical position boom 3 which remains in its position relative to said arm, is displaced in the opposite direction. Said shaft consequently effects a displacement in an opposite direction with respect to the previous, along slideways 41, until slide members 39 engage the forward ends 41a of the slideways in position a. Transverse shaft 82 is then again locked in position while arm 5 continues its angular movement about said shaft. The load bucket engages the ground through the intermediary of rollers 52 (cf., FIG. 8); the displacement is continued until the load bucket reposes entirely on the ground. It is then sufficient to lower slightly the arm for disengaging the hook from the gripping ring provided on the load bucket.

When it is desired to bring the device again into its initial position, it is sufficient to advance the vehicle so as to prevent hook 4 to engage again gripping element 48. Hydraulic jack 9 is then actuated in the opposite direction so as to bring arm 5 and boom 3 back into their initial position.

The various operations effected with a view to bringing arm 5 and boom 3 back into their initial position are the same as the operations carried out during the loading process of the load bucket 16, which loading process will now be described hereinafter.

The device is now in its final position reached during the unloading process; terminal transverse shaft 82 thus is in the position indicated by A in FIG. 2.

The load bucket to be loaded reposes on the ground, the vehicle is moved rearwardly whereby arm 5 and boom 3 are brought into a position wherein hook 4 may be raised so as to engage gripping member 48 due to the action of hydraulic jack 9 with a view to retracting its rod 11.

The rotational movement of arm 5 in the direction corresponding to raising hook 4 is continued, whereby load bucket 60 is raised and advances on supporting rollers 52 until it reaches position A2 shown in FIG. 2; the rotational motion continues while transverse terminal shaft 82 remains in its abutting position as indicated in A. After an angular displacement of about 120° arm 5 is in the position indicated by A in FIG. 5, while hook 4 retains load bucket 60 which is now partly loaded on the vehicle and which has effected a displacement by rolling on guide rollers 54.

During this angular or rotational displacement boom 3 remains locked in its angular position with respect to arm 5 due to the effect of stop members 17. When the angular displacement is terminated rollers 92 associated with lugs 29 engage the surfaces 95 of the front stop members 93. Hydraulic jack 9 is then again actuated with a view to extending its rod 11 so as to bring transverse terminal shaft 82 into its rearward end position as indicated by reference-letter B in FIG. 9. Arm 5 which supports the load is then displaced in a substantially horizontal direction until, at the same time, rollers 92 engage the vertical surface 99 of stop members 94 and transverse terminal shaft 82 reaches its abutting position B wherein it is in engagement with the rear ends 41b of the slideways, through the intermediary of the associated slide members.

Hydraulic jack 9 is then again retracted (cf. FIG. 10) whereby, on account of the inclined position of said jack and on account of the supported weight, arm 5 is displaced so as to effect successively an angular downwardly directed movement and a forwardly directed translational movement, while rollers 92 engage the vertical surfaces 96 of the front stop members 93, thus causing a rotational displacement of boom 3 about shaft 7, which rotational movement causes, in turn, the displacement of load bucket 60 over a distance L (cf., FIG. 2), said distance L being substantially greater than the distance $l$ representing the magnitude of the retracting motion of the hydraulic jack.

When said jack is entirely retracted load bucket 60 is in its definite position. Rollers 92 then engage simultaneously the vertical surfaces 96 and the horizontal surfaces 90 of the recesses 100 associated with the lugs (cf., FIG. 11).

The dumping or tilting operation will now be described herein-below.

Initially, the device according to the instant invention is in position A1 (cf. FIG. 2); rollers 92 and locking beam 24 are in the position indicated in FIG. 11.

Hydraulic jack 9 is then actuated, whereby clearance J is suppressed, and the end of locking beam 24 reaches its abutment position in notch 65. As terminal shaft 82 is prevented from being further displaced rearwardly, hydraulic jack 9 raises arm 5 while effecting a pivotal motion about shaft 56 (cf., FIG. 12). As chassis 10 is rigidly connected to beam members 5a of arm 5, by the effort of studs 23 which are engaged in the recesses 31, said chassis is displaced by arm 5 and effects an angular movement about shaft 80 (cf., FIG. 12). The load bucket is consequently displaced under the action of hook 4 and tilts about shaft 80 while reposing on guide rollers 54.

It is important to note that boom 3 is locked itself against angular movement due to lugs 91 and rollers 92 engaged in the recesses 100 of the chassis.

Hydraulic jack 9 is stopped as soon as the inclination of chassis 10 and the load bucket 60 is sufficient for evacuating the load from said load bucket.

The handling device according to the instant invention allows of effecting all the handling operations requested in connection with a removable load bucket, while using a single pressure fluid jack, which constitutes a substantial advantage by comparison to the known handling devices of the type considered herein.

In the embodiment shown in FIG. 13 the boom has an angled configuration in its portion comprised between the gripping means and the pivotal connection; thus, when the load bucket is placed on the vehicle, one portion 3a of the boom, which comprises the gripping hook, is in a vertical position, and the other portion 3b of said boom is in a horizontal position underneath the load bucket. Due to this feature it is possible to obtain for a given displacement of the transverse terminal shaft a displacement of a greater magnitude of the end of the boom.

It should be well understood that the embodiments shown and described hereinabove may be varied in many respects by any person skilled in the art, without departure from the spirit or scope of the invention, said scope being defined by the following claims.

What is claimed is:

1. A device for handling a load bucket removably mountable on a vehicle having a front end and a rear end and a framework extending longitudinally between said vehicle front and rear ends, said device comprising a boom having first and second ends and being provided, at said first end, with gripping means for gripping said bucket, while being pivotally connected at said second end to an arm which is pivotally connected to a shaft arranged transversally with respect to the framework of said vehicle and supported by a chassis which has a front end and a rear end and which also supports said boom, means being provided for angularly displacing said arm in a substantially vertical plane, at least one stop member being provided on said arm in the vicinity of said point of pivotal connection between said boom for limiting the pivotal movement of said boom with respect to said arm, said second end of said boom being provided with at least one lug adapted to co-operate with at least two abutment members located on a line extending longitudinally with respect to said vehicle framework, said abutment members being fixedly mounted on said front end of said chassis, said chassis comprising means for enabling said transverse shaft to be displaced longitudinally with respect to said framework, as well as shaft locking means for locking said shaft in a desired position with respect to said chassis, the latter being pivotally mounted at its end opposed to said boom on said vehicle framework, said device further comprising arm locking means for locking said arm in a predetermined angular position with respect to said chassis when said load bucket is placed on said vehicle.

2. The device of claim 1 wherein the portion of the boom located between said gripping means and the pivotal connection between said boom and said arm has a substantially rectilinear configuration.

3. The device of claim 1 wherein the portion of said boom which is comprised between said gripping means and the pivotal connection between said boom and said arm has an angular configuration.

4. The device of claim 1 wherein said arm comprises two arm beam members arranged side by side, and wherein said chassis comprises two chassis beam members placed side by side, said means for locking said arm in a desired angular position with respect to said chassis comprising two studs provided, respectively, on said two arm beam members and adapted to co-operate with two corresponding recesses provided, respectively, in said two chassis beam members.

5. The device of claim 1 wherein said boom comprises two boom beam members which are placed side by side, each one of said boom beam members being freely pivotally connected to a respective one of said arm beam members, said boom beam members being connected to each other by a cross member located in the vicinity of the pivotal connection between said arm and said boom and in the boom portion which comprises the boom end provided with said gripping means, said cross member being adapted to engage stop members which are provided on said arm, for locking said boom in a predetermined angular position with respect to said arm.

6. A device for handling a load bucket removably mountable on a vehicle having a front end and a rear end and a framework extending longitudinally between said vehicle front and rear ends, said device comprising a boom having first and second ends and being provided, at said first end, with gripping means for gripping said bucket, while being pivotally connected at said second end to an arm which is pivotally connected to a shaft arranged transversally with respect to the framework of said vehicle and supported by a chassis which has a front end and a rear end and which also supports said boom, means being provided for angularly displacing said arm in a substantially vertical plane, at least one stop member being provided on said arm in the vicinity of the point of pivotal connection between said arm and said boom for limiting the pivotal movement of said boom with respect to said arm, said second end of said boom being provided with at least one lug being adapted to co-operate with at least two abutment members located on a line extending longitudinally with respect to said vehicle framework, said abutment members being fixedly mounted on said front end of said chassis, said chassis comprising means for enabling said transverse shaft to be displaced longitudinally with respect to said framework, as well as shaft locking means for locking said shaft in a desired position with respect to said chassis, the latter being pivotally mounted at its end opposed to said boom on said vehicle framework, said device further comprising arm locking means for locking said arm in a predetermined position with respect to said chassis when said load bucket is placed on said vehicle, said boom comprising two boom beam members which are placed side by side, each one of said boom beam members being freely pivotally connected to a respective one of said arm beam members, said boom beam members being connected to each other by a cross member located in the vicinity of the pivotal connection between said arm and said boom and in the boom portion which comprises the boom end provided with said gripping means, said cross member being adapted to engage stop members which are provided on said arm, for locking said boom in a predetermined angular position with respect to said arm, two lugs being arranged at the boom portion comprised between the boom end which is provided with said gripping means and the pivotal connection between said boom and said arm, said lugs being adapted to co-operate each with at least one abutment member integrally connected to each one of the front ends of said chassis.

7. A device for handling a load bucket removably mountable on a vehicle having a front end and a rear end and a framework extending longitudinally between said vehicle front and rear ends, said device comprising a boom having first and second ends and being provided, at said first end, with gripping means for gripping said bucket, while being pivotally connected at said second end to an arm which is pivotally connected to a shaft arranged transversally with respect to the framework of said vehicle and supported to a chassis which has a front end and a rear end and which also supports said boom, means being provided for angularly displacing said arm in a substantially vertical plane, at least one stop member being provided on said arm in the vicinity of the point of pivotal connection between said arm and said boom for limiting the pivotal movement of said boom with respect to said arm, said second end of said boom being provided with at least one lug adapted to co-operate with at least two abutment members located on a line extending longitudinally with respect to said vehicle framework, said abutment members being fixedly mounted on said front end of said chassis, said chassis comprising means for enabling said transverse shaft to be displaced longitudinally with respect to said framework, as well as shaft locking means for locking said shaft in a desired position with respect to said chassis, the latter being pivotally mounted at its end opposed to said boom on said vehicle framework, said device further comprising arm locking means for locking said arm in a predetermined angular position with respect to said chassis when said load bucket is placed on said vehicle, said boom comprising two boom beam members which are placed side by side, each one of said boom beam members being freely pivotally connected to a respective one of said arm beam members, said boom beam members being connected to each other by a cross member located in the vicinity of the pivotal connection between said arm and said boom and in the boom portion which comprises the boom end provided with said gripping means, said cross member being adapted to engage stop members which are provided on said arm, for locking said boom in a predetermined angular position with respect to said arm, two lugs being arranged at the boom portion comprised between the boom end which is provided with said gripping means and the pivotal connection between said boom and said arm, said lugs being adapted to co-operate each with at least one abutment member integrally connected to each one of the front ends of said chassis, front abutment members being nprovided at the front ends of the chassis beam members, and rear abutment members being provided at the rear ends of said chassis beam members, said front abutment members being adapted to limit the forward movement of said lugs associated with said boom, while said rear abutment members are adapted to limit the rearward movement of said lugs.

8. A device for handling a load bucket removably mountable on a vehicle having a front end and a rear end and a framework extending longitudinally between said vehicle front and rear ends, said device comprising a boom having first and second ends and being provided, at said first end, with gripping means for gripping said bucket, while being pivotally connected at said second end to an arm which is pivotally connected to a shaft arranged transversely with respect to the framework of said vehicle and supported by a chassis which has a front end and a rear end and which also supports said boom, means being provided for angularly displacing said arm in a substantially vertical plane, at least one stop member being provided on said arm in the vicinity of the point of pivotal connection between said arm and said boom for limiting the pivotal movement of said boom with respect to said arm, said second end of said boom being provided with at least one lug adapted to co-operate with at least two abutment members located on a line extending longitudinally with respect to said vehicle framework, said abutment members being fixedly mounted on said front end of said chassis, said chassis comprising means for enabling said transverse shaft to be displaced longitudinally with respect to said framework, as well as shaft locking means for locking said shaft in a desired position with respect to said chassis, the latter being pivotally mounted at its end opposed to said boom on said vehicle framework, said device further comprising arm locking means for locking said arm in a predetermined angular position with respect to said chassis when said load bucket is placed on said vehicle, said boom comprising two boom members which are placed side by side, each one of said boom beam members being freely pivotally connected to a respective one of said arm beam members, said boom beam members being connected to each other by a cross member located in the vicinity of the pivotal connection between said arm and said boom and in the boom portion which comprises the boom end provided with said gripping means, said cross member being adapted to engage stop members which are provided on said arm, for locking said boom in a predetermined angular position with respect to said arm, two lugs being arranged at the boom portion comprised between the boom end which is provided with said gripping means and the pivotal connection between said boom and said arm, said lugs being adapted to co-operate each with at least one abutment member integrally connected to each one of the front ends of said chassis, front abutment members being provided at the front ends of the chassis beam members, and rear abutment members being provided at the ear ends of said chassis beam members, said front abutment members being adapted to limit the forward movement of said lugs associated with said boom, while said rear abutment members are adapted to limit the rearward movement of said lugs, said front abutment members having at least one rearwardly directed transverse vertical surface, and said rear abutment members having at least one forwardly directed transverse vertical suface, said transverse vertical surfaces being connected at their lower ends by a horizontal surface.

9. The device of claim 1 wherein a pressure fluid jack for angularly displacing said arm is mounted between two arm beam members constituting said arm and arranged in a side by side relation, said jack being pivotally mounted at its front end on a frame supporting said device, which frame is integrally connected to the framework of said vehicle, and the rear end of said jack being pivotally connected to a transverse shaft connecting said arm beam members.

10. The device of claim 1 wherein said means for displacing said transverse shaft comprise slide members mounted onto the ends of said transverse shaft and adapted to be slidingly displaced in slide-ways provided, respectively, in two chassis beam members which constitute said chassis and which are arranged in side by side relation.

11. A device for handling a load bucket removably mounted on a vehicle having a front end and a rear end and a framework extending longitudinally between said vehicle front and rear ends, said device comprising a boom having first and second ends and being provided, at said first end, with gripping means for gripping said bucket, while being pivotally connected at said second arm to an arm which is pivotally connected to a shaft arranged transversally with respect to the framework of said vehicle and supported by a chassis which has a front end and a rear end and which also supports said boom, means being provided for angularly displacing said arm in a substantially vertical plane, at least one stop member being provided on said arm in the vicinity of the point of pivotal connection between said arm and said boom for limiting the pivotal movement of said boom with respect to said arm, said second end of said boom being provided with at least one lug adapted to co-operate with at least two abutment members located on a line extending longitudinally with respect to said vehicle framework, said abutment members being fixedly mounted on said front end of said chassis, said chassis comprising means for enabling said transverse shaft to be displaced longitudinally with respect to said framework, as well as shaft locking means for locking said shaft in a desired position with respect to said chassis, the latter being pivotally mounted at its end opposed to said boom on said vehicle framework, said device further comprising arm locking means for locking said arm in a predetermined angular position with respect to said chassis when said load bucket is placed on said vehicle, said means for displacing said transverse shaft comprising slide members mounted onto the ends of said transverse shaft and adapted to be slidingly displaced in slide-ways provided, respectively, in two chassis beam members which essentially constitute said chassis and which are arranged in side by side relation, each one of said slide ways comprising at each one of its ends an abutment member.

12. The device of claim 1 wherein said means for locking said transverse shaft comprise a locking beam pivotally connected to said transverse shaft, said locking beam having one end adapted to engage a notch provided in a cross member of said chassis, and a rotatively mounted cam being provided and adapted to raise said locking beam.

* * * * *